United States Patent
Rathinagiri et al.

(10) Patent No.: US 10,942,900 B2
(45) Date of Patent: Mar. 9, 2021

(54) TECHNIQUES FOR TENANT CONTROLLED VISUALIZATIONS AND MANAGEMENT OF FILES IN CLOUD STORAGE SYSTEMS

(71) Applicant: Oracle International Corporation, Redwood Shores, CA (US)

(72) Inventors: Prabhakaran Rathinagiri, Bangalore (IN); Chandrasekhar Atla, Bangalore (IN); Amit Kumar Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 822 days.

(21) Appl. No.: 14/728,697

(22) Filed: Jun. 2, 2015

(65) Prior Publication Data

US 2016/0357739 A1    Dec. 8, 2016

(51) Int. Cl.
G06F 16/182    (2019.01)
G06F 16/16     (2019.01)
H04L 29/08     (2006.01)

(52) U.S. Cl.
CPC ........ *G06F 16/1827* (2019.01); *G06F 16/168* (2019.01); *H04L 67/1097* (2013.01)

(58) Field of Classification Search
CPC . G06F 16/1827; G06F 16/168; H04L 67/1097
See application file for complete search history.

(56) References Cited

U.S. PATENT DOCUMENTS 8,316,125 B2    11/2012    DeHaan
8,346,935 B2     1/2013    Mayo et al.
(Continued)

FOREIGN PATENT DOCUMENTS

WO    2013/163680 A1    11/2013

OTHER PUBLICATIONS

Cloud Control Module—VMTurbo's Private Cloud Management Extension. vmturbo.com [online]. Copyright VMTurbo, Inc. [retrieved Dec. 17, 2014]. Retrieved from the Internet: <URL: http://vmturbo.com/product/control-modules/cloud-management-software/>, 3 pages.

(Continued)

*Primary Examiner* — James Trujillo
*Assistant Examiner* — Kurt A Mueller
(74) *Attorney, Agent, or Firm* — Kilpatrick Townsend & Stockton LLP

(57) ABSTRACT

In certain embodiments, techniques are provided (e.g., a method, a system, non-transitory computer-readable medium storing code or instructions executable by one or more processors) to provide data visualization and management services for files stored in a cloud storage system. In some embodiments, a tenant (e.g., an end user, customer, or subscriber to a cloud storage service) can view how their data is stored across data centers within a cloud storage service. A cloud file manager can analyze the tenant's data stored in the cloud storage service, and generate a data visualization interface that provides a fine grained visual representation of the tenant's data across the cloud storage service. In some embodiments, the tenant can define storage profiles and/or modify existing data storage locations dynamically through the data visualization interface. This simplifies data management for the tenants and provides increased flexibility of managing data in the cloud storage service.

20 Claims, 7 Drawing Sheets

(56) References Cited

U.S. PATENT DOCUMENTS

| | | | |
|---|---|---|---|
| 8,533,261 | B2 | 9/2013 | Janedittakarn et al. |
| 8,621,051 | B2 | 12/2013 | Agarwala et al. |
| 8,793,379 | B2 | 7/2014 | Upadhya |
| 9,391,972 | B2 | 7/2016 | Jain |
| 9,471,353 | B1 | 10/2016 | Christopher et al. |
| 10,182,107 | B2 | 1/2019 | Jain |
| 2006/0070031 | A1 | 3/2006 | Szyperski |
| 2006/0080646 | A1 | 4/2006 | Aman |
| 2006/0184410 | A1 | 8/2006 | Ramamurthy et al. |
| 2010/0005443 | A1 | 1/2010 | Kwok et al. |
| 2010/0198845 | A1 | 8/2010 | Kutsch |
| 2011/0213870 | A1 | 9/2011 | Cai et al. |
| 2011/0302133 | A1 | 12/2011 | Kuruganti et al. |
| 2011/0302212 | A1* | 12/2011 | Agrawal ........... G06F 17/30371 707/793 |
| 2012/0143819 | A1 | 6/2012 | Tan |
| 2012/0166488 | A1 | 6/2012 | Kaushik et al. |
| 2012/0191754 | A1 | 7/2012 | Cecilia Torralba et al. |
| 2013/0014082 | A1 | 1/2013 | Kang et al. |
| 2013/0086322 | A1 | 4/2013 | Pelletier et al. |
| 2013/0145006 | A1 | 6/2013 | Tammam |
| 2014/0006580 | A1 | 1/2014 | Raghu |
| 2014/0007093 | A1 | 1/2014 | Deshpande et al. |
| 2014/0019459 | A1 | 1/2014 | Gradin et al. |
| 2014/0122649 | A1 | 5/2014 | Calvin et al. |
| 2014/0189070 | A1 | 7/2014 | Gero |
| 2015/0007263 | A1 | 1/2015 | Stewart et al. |
| 2016/0078120 | A1* | 3/2016 | Pradeep ................. H04L 67/02 707/737 |
| 2016/0087859 | A1* | 3/2016 | Kuan ................. H04L 43/0817 715/736 |
| 2016/0087861 | A1* | 3/2016 | Kuan ................... H04L 43/065 709/224 |
| 2016/0140139 | A1* | 5/2016 | Torres ............... G06F 17/30174 707/610 |
| 2016/0337215 | A1* | 11/2016 | Wunderlich ............ H04L 67/10 |

OTHER PUBLICATIONS

Google Cloud Platform: Storing and Analyzing Your Data in Google's Cloud. White Paper [online]. Google, Inc. [retrieved Dec. 17, 2014]. Retrieved from the Internet: <URL: https://cloud.google.com/files/articles/google-cloud_technical-article_overview-of-storage-options.pdf>, 14 pages.

Heroku | Features. Heroku.com [online]. Heroku, Inc. [retrieved Dec. 17, 2014]. Retrieved from the Internet: <URL: https://www.heroku.com/features>, 8 pages.

Cloud Storage—Cloud Leverage. cloudleverage.com [online]. Copyright 2009-2012 Cloud Leverage, Inc. [retrieved Dec. 17, 2014]. Retrieved from the Internet: <URL: http://cloudleverage.com/cloud-storage/>, 2 pages.

Amazon EC2. Amazon.com [online]. Copyright 2014 Amazon Web Services, Inc. [retrieved Dec. 17, 2014]. Retrieved from the Internet: <URL: http://aws.amazon.com/ec2/>, 6 pages.

Amazon EC2 Product Details. Amazon.com [online]. Copyright 2014 Amazon Web Services, Inc. [retrieved Dec. 17, 2014]. Retrieved from the Internet: <URL: http://aws.amazon.com/ec2/details/>, 15 pages.

GIS Cloud. giscloud.com [online]. Copyright 2014 GIS Cloud Ltd. [retrieved Dec. 16, 2014]. Retrieved from the Internet: <URL: http://www.giscloud.com/about-us/>, 9 pages.

GIS Cloud Multi-tenant Platform | GIS Cloud Developers. giscloud.com [online]. Copyright 2014 GIS Cloud Developers [retrieved Dec. 16, 2014]. Retrieved from the Internet: <URL: http://developers.giscloud.com/overview/gis-cloud-multi-tenant-platform/>, 3 pages.

Kony Cloud: Architecture and Security Overview. Technical Brief [online]. Copyright 2014 Kony Solutions, Inc. [retrieved Dec. 17, 2014]. Retrieved from the Internet: <URL: http://forms.kony.com/rs/konysolutions/images/Kony-DS-Architecture-and-Security-Overview.pdf>, 18 pages.

EMC Atmos Cloud Storage Architecture. EMC White Paper [online]. Sep. 2014, EMC Corporation [retrieved Dec. 17, 2014]. Retrieved from the Internet: <URL: http://www.emc.com/collateral/software/white-papers/h9505-emc-atmos-archit-wp.pdf>, 20 pages.

Ramadas, J. et al., "Extended Java EE Containers with cloud characteristics," May 12, 2011; located at http://www.ibm.com/developerworks/cloud/library/cijeecontainercloud/, retrieved Jan. 28, 2014, 13 page.

Hahn, M. "Approach and Realization of a Multi-tenant Service Composition Engine," University of Stuttgart, Diploma Thesis, Nr. 3546, Nov. 11, 2013, 111 pages.

Mladenov, T., "Multi-Tenancy Options in Cloud Environments," JAVA Developer's Journal, Jun. 3, 2013, located at http://java.sys-con.com/node/2684531, retrieved Jan. 29, 2014, 5 pages.

DataNucleus—JDO Multitenancy, "DataNucleus AccessPlatform 3.3 Documentation," located at http://datanucleus.org/products/accessplatform_3_3/jdo/multitena . . . , retrieved Jan. 29, 2014, 4 pages.

Commons Configuration—Multi-tenant Configuration, Apache Commons, Oct. 27, 2013, locted at http://commons.apache.org/proper/commons-configuration/userguide/h . . . , retrieved Jan. 29, 2014, 2 pages.

Non-Final Office Action dated Nov. 20, 2015, for U.S. Appl. No. 14/484,818, 10 pages.

Notice of Allowance dated Mar. 14, 2016 for U.S. Appl. No. 14/484,818, filed Sep. 12, 2014, 13 pages.

U.S. Appl. No. 15/178,435 Non-Final Office Action, dated Oct. 5, 2017, 10 pages.

U.S. Appl. No. 15/178,435 Final Office Action, dated May 9, 2018, 12 pages.

* cited by examiner

TECHNIQUES FOR TENANT CONTROLLED VISUALIZATIONS AND MANAGEMENT OF FILES IN CLOUD STORAGE SYSTEMS

BACKGROUND OF THE INVENTION

The present disclosure relates generally to computer systems and software, and more particularly to techniques for providing tenant controlled visualizations and management in a cloud storage environment.

Data storage, both from an enterprise and from a consumer perspective, has progressed from locally stored storage systems for each computer system, to network attached storage which serves as centralized storage for a number of networked computer systems. These systems are typically owned and maintained by the end user, resulting in significant costs and complexity for end users to manage. In response, cloud-based storage services have been created which provide secure, elastic, reliable, and cost-effective storage solutions. With cloud-based storage services, the end user need only enroll in the service and the service provider manages the hardware and configuration, data security and integrity, etc. This enables users to change the amount of storage available cheaply and easily, by signing up for a different level of service. Once enrolled, authorized users and/or applications can access the data from any Internet-connected device.

Although users save on the costs, maintenance, and configuration and data storage in a cloud-based storage service, the users typically lose the ability to organize and manage how their data is stored by the cloud service provider. For example, cloud storage services may be provided in a multitenant architecture, where different users are utilizing services from the same hardware and/or virtual machines (e.g., data from different customers may be stored on the same disk). Additionally, a user's data may be stored across multiple data centers managed by the cloud storage provider. As such, in typical cloud storage systems, the customer's ability to manage their data may be limited.

BRIEF SUMMARY OF THE INVENTION

In certain embodiments, techniques are provided (e.g., a method, a system, non-transitory computer-readable medium storing code or instructions executable by one or more processors) to provide data visualization and management services for files stored in a cloud storage system. In some embodiments, a tenant (e.g., an end user, customer, or subscriber to a cloud storage service) can view how their data is stored across data centers within a cloud storage service. A cloud file manager can analyze the tenant's data stored in the cloud storage service, and generate a data visualization interface that provides a fine grained visual representation of the tenant's data across the cloud storage service. In some embodiments, the tenant can define storage profiles and/or modify existing data storage locations dynamically through the data visualization interface. This simplifies data management for the tenants and provides increased flexibility of managing data in the cloud storage service.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Previously, cloud storage services do not enable tenants to manage the storage of their data with the cloud storage provider. For example, a user may sign up for cloud storage services and may be allocated a particular amount of disk space on which to store their data. The disk space may be allocated across multiple storage arrays in various data centers. Additionally, the storage arrays used by one tenant may also store data from multiple tenants. Because tenants do not have control of where or how their data is stored, the tenants may risk data being stored in geographic locations that are undesirable or on shared storage arrays that risk comingling data with competitors.

In certain embodiments, techniques are provided (e.g., a method, a system, non-transitory computer-readable medium storing code or instructions executable by one or more processors) to provide data visualization and management services for files stored in a cloud storage system. In some embodiments, a tenant (e.g., an end user, customer, or subscriber to a cloud storage service) can view how their data is stored across data centers within a cloud storage service. A cloud file manager can analyze the tenant's data stored in the cloud storage service, and generate a data visualization interface that provides a fine grained visual representation of the tenant's data across the cloud storage service. In some embodiments, the tenant can define storage profiles and/or modify existing data storage locations dynamically through the data visualization interface. This simplifies data management for the tenants and provides increased flexibility of managing data in the cloud storage service.

Figure 1:
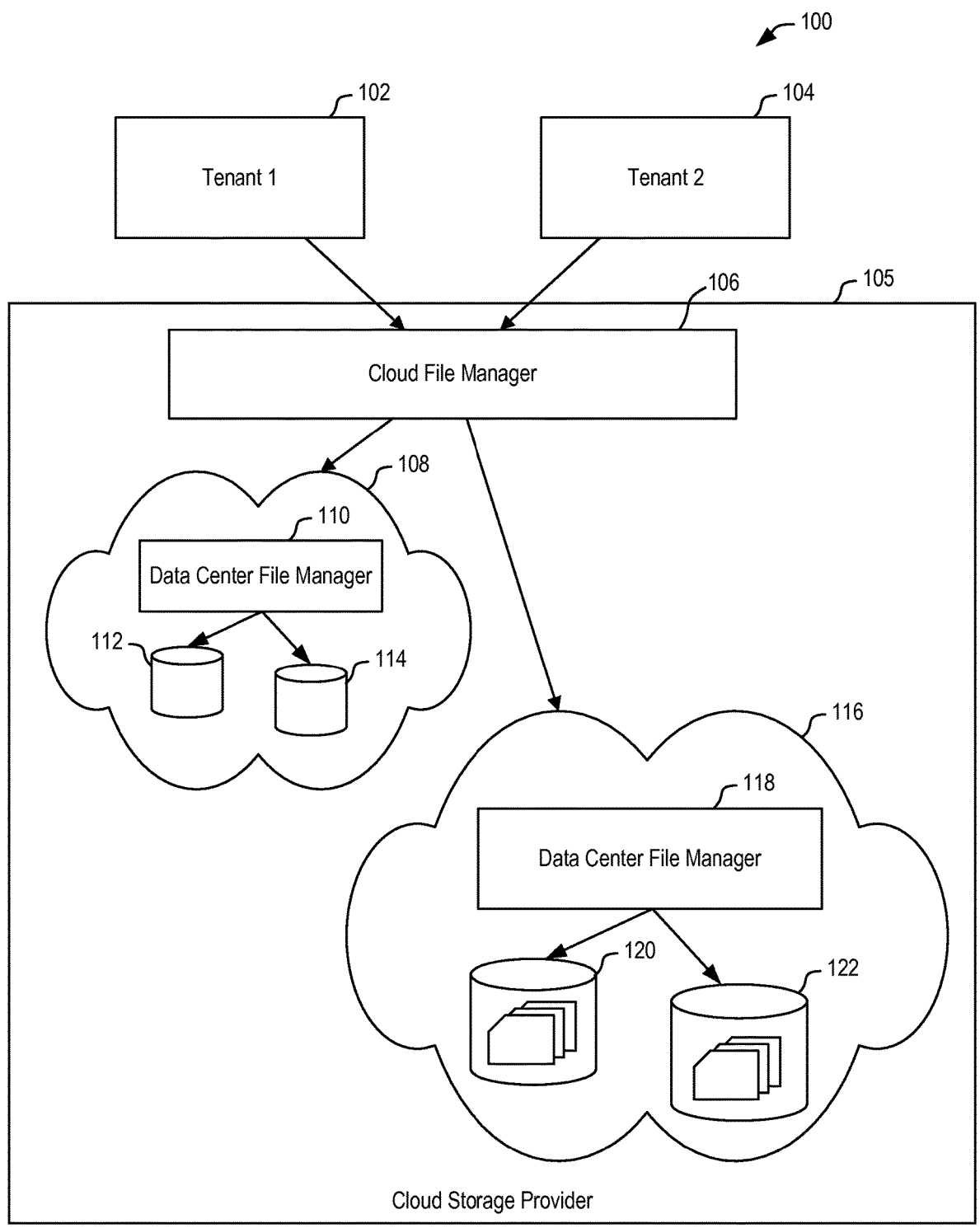
FIG. 1 depicts a diagram of a network environment that may incorporate an embodiment of the present invention.

FIG. 1 depicts a diagram of a network environment 100 that may incorporate an embodiment of the present invention. As shown in FIG. 1, multiple tenants (e.g., tenant 1 102 and tenant 2 104) can access cloud-based storage services from cloud storage provider 105. Cloud storage services can include any storage services managed by cloud storage provider 105, such as object storage service, block storage services, and other storage services to store structured and/or unstructured data. For simplicity of explanation, embodiments of the present invention are described below with respect to object storage services (e.g., storage of unstructured data, such as files, photos, video, documents, and other content); however embodiments of the present invention are applicable to any cloud-based storage services.

In some embodiments, cloud storage provider 105 can include a Cloud File Manager 106 which may act as a layer between tenants 102, 104 and their data stored in data centers 108, 116. Each data center 108, 116 can include clustered storage nodes 112, 114, 120, 122 (e.g., hardware and/or virtual storage nodes such as those available from Oracle Cloud). Each tenant's data can be stored across data centers 108, 116 on different storage nodes and storage clusters. Each object stored by a tenant may be associated with a metadata file. As described further below, each metadata file may include information about its associated object (such as a tenant identifier, data center identifier, data center location, etc.). As shown in FIG. 1, each data center can include one or more data center file managers 110, 118. In some embodiments, data center file managers 110, 118 can maintain the metadata for each object stored in data center 108, 116, respectively. When a data visualization request is received, cloud file manager 106 can determine which data centers include the requesting tenant's data, and can request metadata from each respective data center file manager (110, 118). In some embodiments, cloud file manager 106 can execute on a cloud file manager server separate from the data centers 108, 116, and may provide a consolidated view of the tenant's data in the cloud storage service. Cloud file manager 106 can retrieve the metadata maintained by each data center file manager 110, 118, and generate a data visualization interface using the metadata which represents the tenant's data stored in the cloud storage service.

As described above, cloud file manager 106 and data center file managers 110, 118 can act as a data management layer which can be added to existing data centers. Each data center file manager 110, 118 can be configured to generate and maintain metadata files for data stored in the existing data centers as data is accessed, stored, or otherwise utilized within the cloud storage system.

Figure 2:
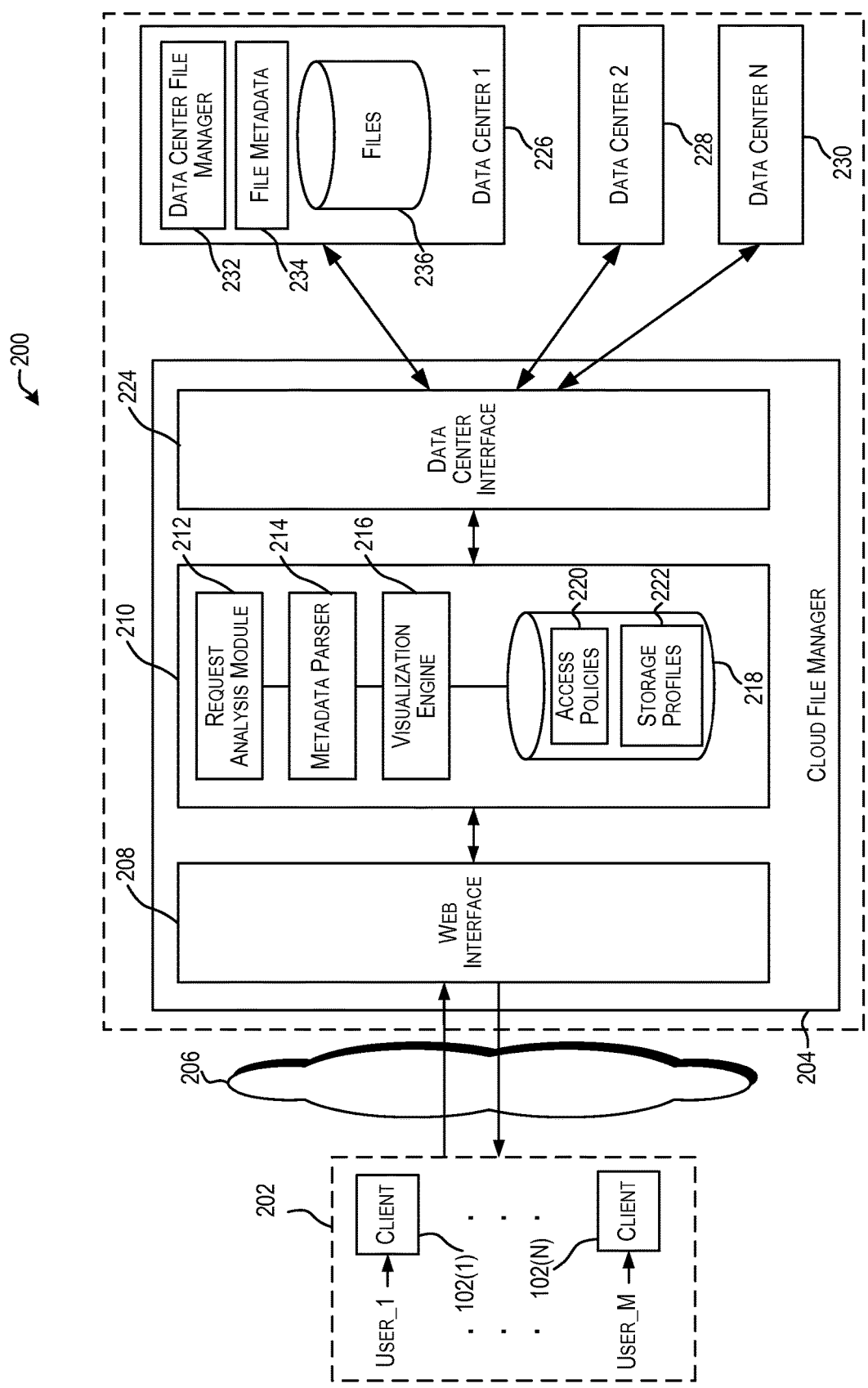
FIG. 2 depicts a diagram of a cloud storage environment including a cloud file manager, in accordance with an embodiment of the present invention.

FIG. 2 depicts a diagram of cloud storage environment 200 including a cloud file manager, in accordance with an embodiment of the present invention. As shown, cloud storage environment 200 may include one or more client devices 202(1)-202(N) (collectively, client devices 202) communicatively coupled to a cloud file manager 204 via a communication network 206. The embodiment depicted in FIG. 2 is merely an example and is not intended to unduly limit the claimed embodiments of the present invention. One of ordinary skill in the art would recognize many variations, alternatives, and modifications. For example, there may be more or fewer client devices than those shown in FIG. 2.

The client devices may be of various different types, including, but not limited to personal computers, desktops, mobile or handheld devices such as a laptop, a mobile phone, a tablet, etc., and other types of devices. Communication network 206 facilitates communications between client devices 202 and data storage system 204. Communication network 206 can be of various types and can include one or more communication networks. Examples of communication network 206 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 106 may include any communication network or infrastructure that facilitates communications between clients and data storage system 104.

In some embodiments, cloud file manager 204 may include a web interface 208 that may be configured to receive and manage requests from client devices 202. Web interface 208 can mediate requests and responses between client devices 202 and cloud file manager 204. For instance, web interface 208 may be configured to receive Hyper Text Transfer Protocol (HTTP) requests from client devices 202 to display a data visualization interface and return a response to client devices 202 through web interface 208 instructing the client devices to render the data visualization interface. Further, requests to change data storage locations, add or update data storage profiles, and other data management actions may also be received through web interface 208.

In some embodiments, cloud file manager 204 may be configured to analyze and generate representations of data stored in a cloud storage service. In some embodiments, cloud file manager 204 may include data analysis module 210 which can receive data visualization and management requests from clients 202 through web interface 208. In some examples, data analysis module 210 can include a request analysis module 212 that is configured to identify data referenced in the data visualization and management requests and identify one or more actions to be performed on the identified data. For example, data visualization and management actions can include a visualization request, a storage request, a reallocation request, metadata management request, and other actions. Cloud file manager 204 can include a data center interface 224 used to communicate with multiple data centers 226, 228, 230 managed by cloud file manager 204. As shown in FIG. 2, each data center 226, 228, 230 can include a data center file manager 232, file metadata 234, and object data 236 (e.g., files, photos, or other unstructured data).

In some embodiments, as described above, each piece of data (e.g., object) stored by a tenant can be associated with a metadata file. The metadata file can include information about its associated object stored in the cloud storage service. This information can include, e.g., file name, size, tenant ID, geo-location, partition of the storage server, LUN or NFS, etc. In some embodiments, objects stored in the cloud storage service can be organized using directories, similar to a local file system. In some embodiments, each directory may also be associated with a metadata file. The metadata files may then be used by the cloud file manager 204 for any processing requested by the tenant or by an administrator. In some embodiments, metadata files may not be accessible by the application layer, such that tenants may not view or directly modify the metadata files. As shown below in Table 1, the metadata files can be implemented as a series of key-value pairs. In some embodiments, metadata can be edited (e.g., to change particular metadata values or to add, remove, or update keys) at the request of a tenant, administrator, and/or data center manager.

TABLE 1

Example Metadata File

| Key | Value |
|---|---|
| File name | em_db.orcl |
| File size | 2.5 G |
| Tenant ID | 762812917382 |
| Geo-location | DC001:Bangalore-data center |
| Partition | /cloud/generic |
| LUN ID | 102 |

When a data visualization request is received, request analysis module 212 can identify data and/or data centers associated with the request. For example, the request may include a request to generate a visualization for any data associated with a particular tenant and request analysis module 212 may then identify each data center that includes data owned by the particular tenant. In some embodiments, the request may specify a particular data center to be viewed or may request relocation of particular data from one storage location to another. Based on the data visualization request, object metadata 234 may then be requested from each data center 226, 228, 230 through data center interface 224. The object metadata returned may then be parsed using metadata parser 214. In some embodiments, different data centers may maintain metadata in different formats and metadata parser 214 can include metadata schemas associated with each format to accurately identify metadata associated with each object. This provides an extensible platform which may enable the cloud file manager 204 to support different storage systems and different metadata types.

In some embodiments, the metadata can be associated with one or more access policies 220 and/or storage profiles 218. Visualization engine 216 can use the access policies and storage profiles to complete the data visualization request. For example, if a requestor is not authorized to view a particular object based on the access policy associated with that object, the visualization engine 216 can restrict the tenant's view (e.g., graying out the object and/or reducing the information about the object that is displayed). Similarly, if a particular object is associated with a storage profile that limits the storage locations where the object may be stored, any data visualization request that attempts to move the object contrary to that policy can result in the display of an error message.

As described above, embodiments of the present invention enable tenants to view a high level visualization of their data, which includes metadata information such as file size, geo-location, and file name, etc. The visualization can depict representations of the tenants' data across data centers within a cloud storage service. Additionally, in some embodiments, tenants may manage how their data is stored in the cloud storage service using the visualization. For example, a tenant may dynamically reallocate their data across different storage nodes in different data centers through the data visualization interface. Further, tenants may define storage profiles that cause their data to be stored in particular data centers, storage nodes, and/or storage node clusters based on the metadata files associated with their data.

In some embodiments, the cloud file manager can use the metadata files to calculate the physical storage space consumed (e.g., total data size) of the tenant's data at the data center level, storage node level, and/or storage node cluster level. Based on the storage space consumed, the cloud file manager can indicate available storage space in particular storage nodes in various data centers. Additionally, in some embodiments, data stored by different tenants may be displayed for the particular storage nodes, subject to access policies maintained by the cloud file manager. For example, tenant A may be able to see how much space is shared with tenant B without being shown an identity of tenant B or object information, other than aggregate size. In some embodiments, the data visualization interface can display other tenants' usage at the partition/array level. In some embodiments, the data visualization interface can display available storage space in a target data center to which a tenant is migrating data. For example, if an organization relocates, a new geographic storage profile may require the migration of the organization's data to a new data center. The available space in the new data center can be displayed and the data migrated to selected storage nodes within the new data center.

In some embodiments, an administrator can migrate a tenant's data on behalf of that tenant or other tenants to consolidate tenants' data to specific arrays and/or storage nodes in a data center. In some embodiments, the actions that can be performed by an administrator are constrained by storage profiles defined by the tenant. For example, a storage profile may define particular geographic storage restrictions which cannot be violated by an administrator or tenant. Additionally, data can be locked by an administrator or tenant to prevent migration of the data.

Figure 3:
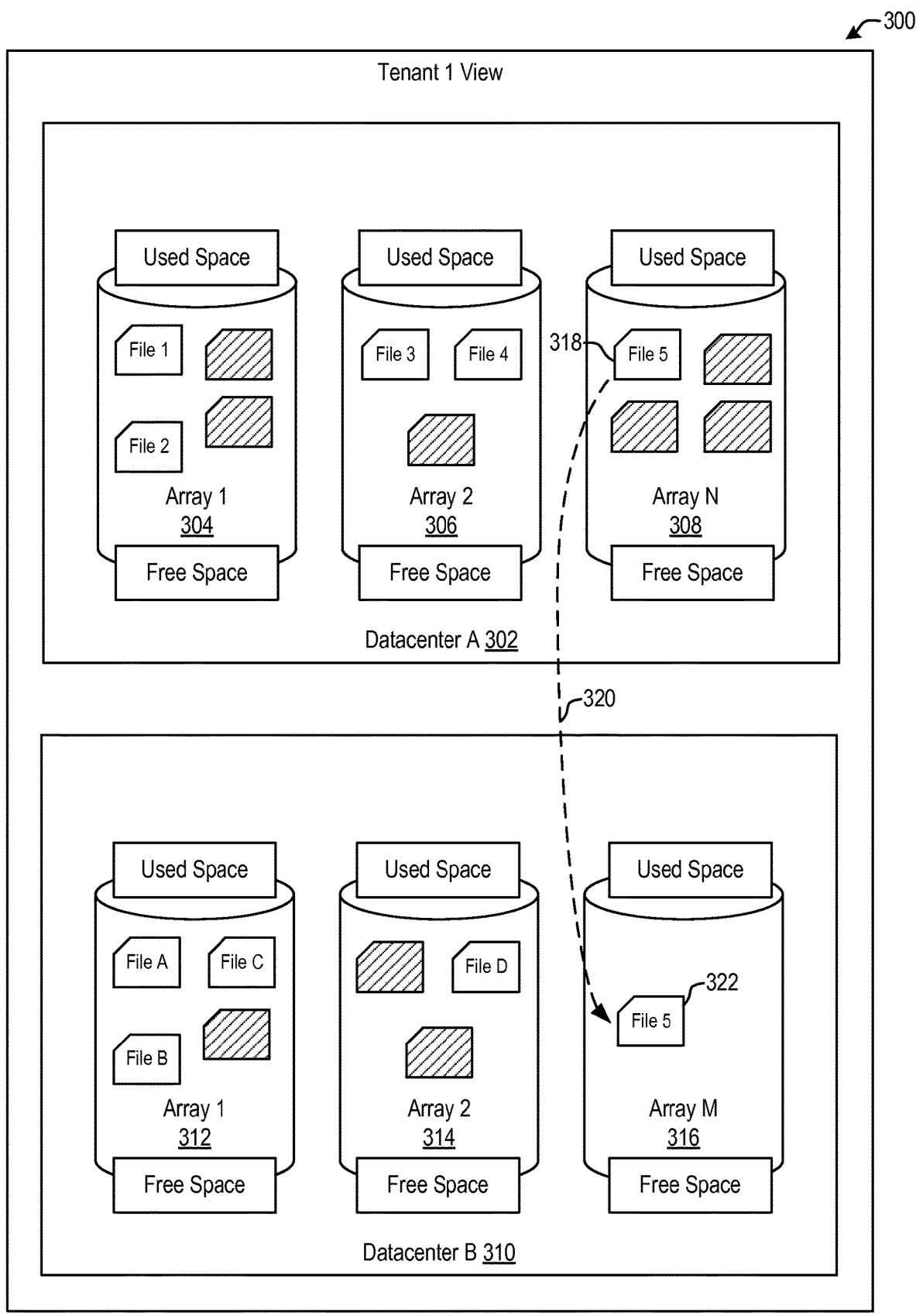
FIG. 3 illustrates an example data visualization interface, in accordance with one embodiment of the present invention.

FIG. 3 illustrates an example data visualization interface 300, in accordance with one embodiment of the present invention. As shown in FIG. 3, data visualization interface 300 can be generated for a particular tenant. Data visualization interface 300 can include multiple data centers 302, 310 based on which data centers store data associated with the tenant. In the example of FIG. 3, the data visualization interface 300 is generated for tenant 1 and tenant 1 has data stored in two data centers 302, 310. Each data center can include visual representations of arrays and/or storage nodes within the data center. As shown in FIG. 3, data center A 302 includes multiple arrays, represented by Array 1 304, Array 2 306, and Array N 308. Similarly, data center B 310 includes multiple arrays, represented by Array 1 312, Array 2 314, and Array M, 316. Each array representation can include representations of the data stored on that array, and can further include information about the array such as an amount of free space available and an amount of used space.

In some embodiments, each array representation 304, 306, 308, 312, 314, 316 can display representations of the data stored on those arrays. Each representation can correspond to one object (such as a file) or multiple objects. In some embodiments, data that is owned by the tenant can be shown with at least a portion of the metadata associated with that data. For example, as shown in FIG. 3, tenant 1 has stored files across the arrays. The files owned by tenant 1 can be displayed with the file name (e.g., file 1, file 2, etc.). In some embodiments, the tenant can select (e.g., using a mouse, touch interface, or other user interface) a representation of a particular object to view additional metadata associated with the object.

In some embodiments, the representations of tenant 1's data and the data of other tenants can be shown based on access policies associated with the data. For example, as described above, the metadata associated with each object stored in the data centers can include an access policy and/or be associated with an access policy that indicates which tenants may view and/or interact with the data. Data that is not owned by the tenant can be grayed-out.

In some embodiments, a user may interact with the data visualization interface to manage the storage locations of the tenant's data. For example, as shown in FIG. 3, a user may select file 5 318 and move 320 the file to a different array, resulting in file 5 322. In some embodiments, a user may click and drag the representation of the data using a mouse or other user input device. In some embodiments, a gesture-based input (e.g., a tap and swipe) can be received to move the representation of the data between storage locations using a touchscreen, or other user interface.

Figure 4:
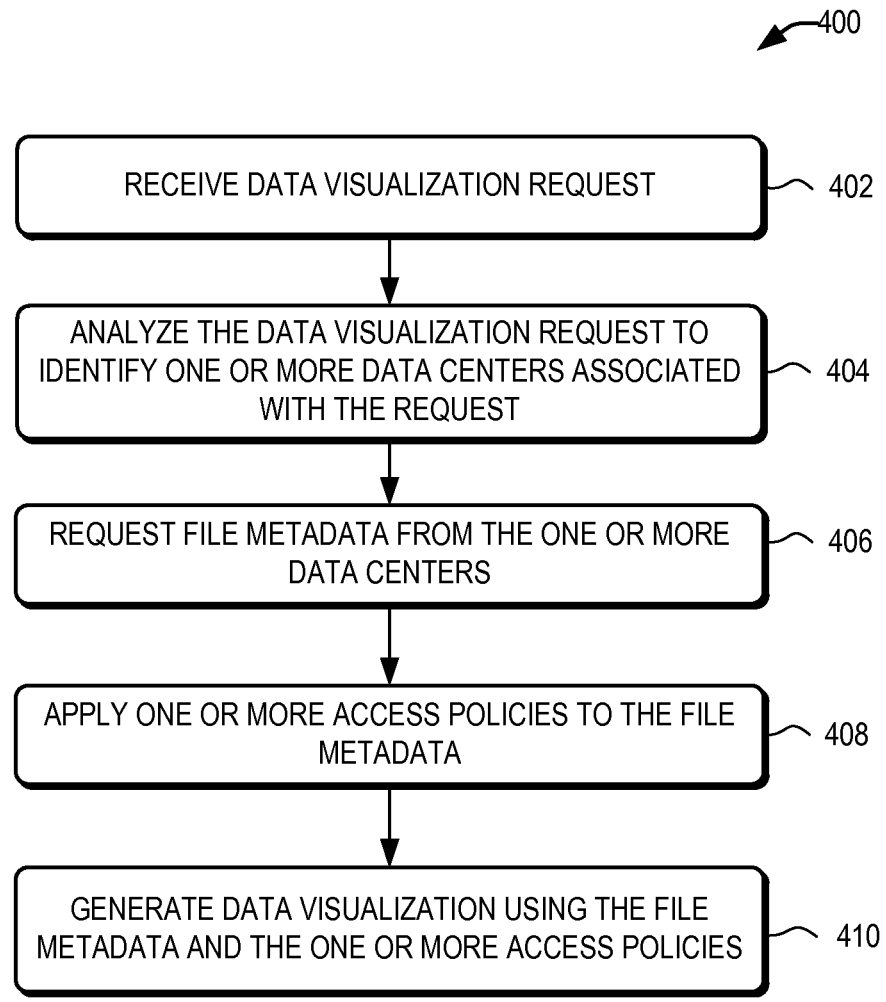
FIG. 4 illustrates an example flow diagram showing a process for analyzing and visualizing tenant-specific data stored in a cloud storage service, in accordance with one embodiment of the present invention.

FIG. 4 illustrates an example flow diagram 400 showing a process for analyzing and visualizing tenant-specific data stored in a cloud storage service, in accordance with one embodiment of the present invention. In some aspects, the process 400 of FIG. 4 may be performed using cloud file manager 106, 204 shown in FIG. 1 and FIG. 2, respectively. The process 400 may begin at 402 by receiving a data visualization request. In some embodiments, the data visualization request can be received through the data visualization interface. In some embodiments, the data visualization request can be a gesture-based input received through the data visualization interface.

At 404, the data visualization request can be analyzed to identify one or more data centers associated with the request. In some embodiments, the data visualization request can be a request to display data associated with a tenant. Each data center associated with that tenant may then be identified. In some embodiments, the data visualization request can be a request to move particular data (e.g., one or more objects) owned by a tenant from one storage location to another. The data centers associated with each storage location may then be identified.

At 406, object metadata can be requested from the one or more data centers. Each item of data (e.g., object) stored in a data center may be associated with metadata. As described above, the metadata may identify information about the item of data, such as access policies, storage profiles, name, size, tenant ID, etc.

At 408, one or more access policies associated with the requested object metadata can be applied to the object metadata based on the data visualization request. In some embodiments, the access policies may indicate which tenants and/or users may view details about the associated item of data. At 410, a data visualization interface can be generated using the object metadata and the one or more access policies. For example, tenants and/or users that are authorized to view the data may be shown a representation of the data and information about the data, while tenants who are not authorized to view the data may be shown a limited view of the data (e.g., the data size, but not the data name or tenant ID). In some embodiments, the object metadata can be associated with storage profiles. The storage profiles can authorize or restrict the actions that may be performed on the associated data. For example, a storage profile may limit the data to being stored in a particular geographic location or may restrict which users are authorized to relocate the data to a different storage location within a given data center.

Figure 5:
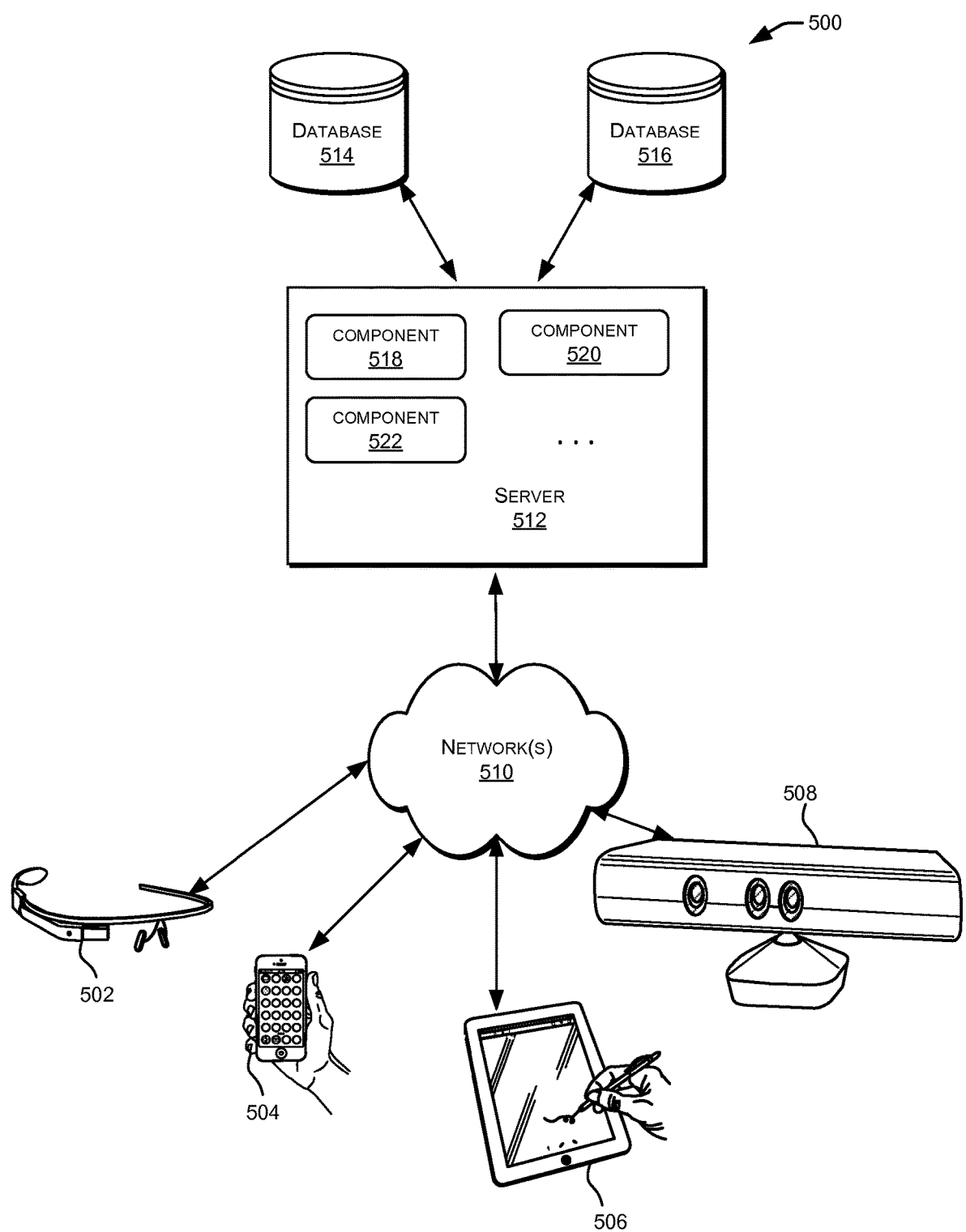
FIG. 5 depicts a simplified diagram of a distributed system for implementing an embodiment of the present invention.

FIG. 5 depicts a simplified diagram of a distributed system 500 for implementing an embodiment of the present disclosure. In the illustrated embodiment, the distributed system 500 includes one or more client computing devices 502, 504, 506, and 508, which are configured to execute and operate a client application such as a web browser, proprietary client (e.g., Oracle Forms), or the like over one or more network(s) 510. The server 512 may be communicatively coupled with the remote client computing devices 502, 504, 506, and 508 via network 510.

In various embodiments, the server 512 may be adapted to run one or more services or software applications such as services and applications that provide storage management services and applications that provide storage management services and identity management services. In certain embodiments, the server 512 may also provide other services or software applications can include non-virtual and virtual environments. In some embodiments, these services may be offered as web-based or cloud services or under a Software as a Service (SaaS) model to the users of the client computing devices 502, 504, 506, and/or 508. Users operating the client computing devices 502, 504, 506, and/or 508 may in turn utilize one or more client applications to interact with the server 512 to utilize the services provided by these components.

In the configuration depicted in FIG. 5, the software components 518, 520 and 522 of system 500 are shown as being implemented on the server 512. In other embodiments, one or more of the components of the system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

The client computing devices 502, 504, 506, and/or 508 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 510.

Although distributed system 500 in FIG. 5 is shown with four client computing devices, any number of client computing devices may be supported. Other devices, such as devices with sensors, etc., may interact with the server 512.

The network(s) 510 in the distributed system 500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 512 can include one or more virtual machines running virtual operating systems, or other computing architectures involving virtualization. One or more flexible pools of logical storage devices can be virtualized to maintain virtual storage devices for the server. Virtual networks can be controlled by the server 512 using software defined networking. In various embodiments, the server 512 may be adapted to run one or more services or software applications described in the foregoing disclosure. For example, the server 512 may correspond to a server for performing processing as described above according to an embodiment of the present disclosure.

The server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 512 may include one or more applications to analyze and consolidate data feeds and/or event updates received from users of the client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 512 may also include one or more applications to display the data feeds and/or real-time events via one or more display devices of the client computing devices 502, 504, 506, and 508.

The distributed system 500 may also include one or more databases 514 and 516. These databases may provide a mechanism for storing information such as user identity information, and other information used by embodiments of the present invention. Databases 514 and 516 may reside in a variety of locations. By way of example, one or more of databases 514 and 516 may reside on a non-transitory storage medium local to (and/or resident in) the server 512. Alternatively, the databases 514 and 516 may be remote from the server 512 and in communication with the server 512 via a network-based or dedicated connection. In one set of embodiments, the databases 514 and 516 may reside in a storage-area network (SAN). Similarly, any necessary files for performing the functions attributed to the server 512 may be stored locally on the server 512 and/or remotely, as appropriate. In one set of embodiments, the databases 514 and 516 may include relational databases, such as databases provided by Oracle, that are adapted to store, update, and retrieve data in response to SQL-formatted commands.

Figure 6:
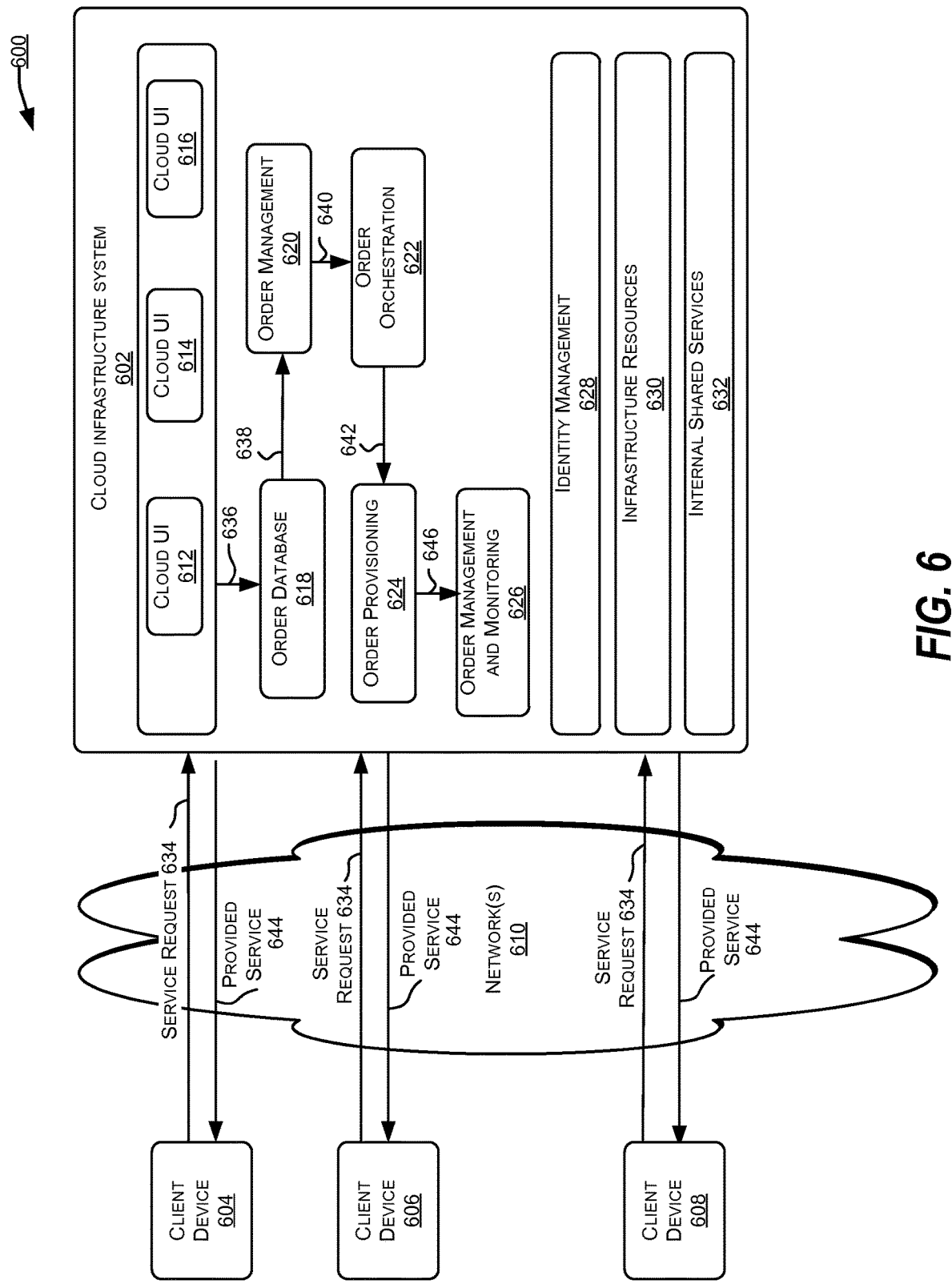
FIG. 6 is a simplified block diagram of one or more components of a system environment in which services may be offered as cloud services, in accordance with an embodiment of the present invention.

In some embodiments, the storage services and identity management services described above may be offered as services via a cloud environment. FIG. 6 is a simplified block diagram of one or more components of a system environment 600 in which services may be offered as cloud services, in accordance with an embodiment of the present disclosure. In the illustrated embodiment in FIG. 6, system environment 600 includes one or more client computing devices 604, 606, and 608 that may be used by users to interact with a cloud infrastructure system 602 that provides cloud services, including services for managing the storage of data stored in a data storage system of an organization. Cloud infrastructure system 602 may comprise one or more computers and/or servers that may include those described above for server 512.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508. Client computing devices 604, 606, and 608 may be configured to operate a client application such as a web browser, a proprietary client application (e.g., Oracle® Forms), or some other application, which may be used by a user of the client computing device to interact with cloud infrastructure system 602 to use services provided by cloud infrastructure system 602. Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

In certain embodiments, services provided by cloud infrastructure system 602 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 602 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle Corporation) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform, and other resources.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 to enable provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In an exemplary operation, at 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI) such as cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

At 636, the order information received from the customer may be stored in an order database 618. If this is a new order, a new record may be created for the order. In one embodiment, order database 618 can be one of several databases operated by cloud infrastructure system 618 and operated in conjunction with other system elements.

At 638, the order information may be forwarded to an order management module 620 that may be configured to perform billing and accounting functions related to the order, such as verifying the order, and upon verification, booking the order.

At 640, information regarding the order may be communicated to an order orchestration module 622 that is configured to orchestrate the provisioning of services and resources for the order placed by the customer. In some instances, order orchestration module 622 may use the services of order provisioning module 624 for the provisioning. In certain embodiments, order orchestration module 622 enables the management of business processes associated with each order and applies business logic to determine whether an order should proceed to provisioning.

As shown in the embodiment depicted in FIG. 6, at 642, upon receiving an order for a new subscription, order orchestration module 622 sends a request to order provisioning module 624 to allocate resources and configure resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. This enables order orchestration module 624 to be isolated from implementation details, such as whether or not services and resources are actually provisioned on the fly or pre-provisioned and only allocated/assigned upon request.

At 644, once the services and resources are provisioned, a notification may be sent to the subscribing customers indicating that the requested service is now ready for use. In some instance, information (e.g. a link) may be sent to the customer that enables the customer to start using the requested services.

At 646, a customer's subscription order may be managed and tracked by an order management and monitoring module 626. In some instances, order management and monitoring module 626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 600 may include an identity management module 628 that is configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
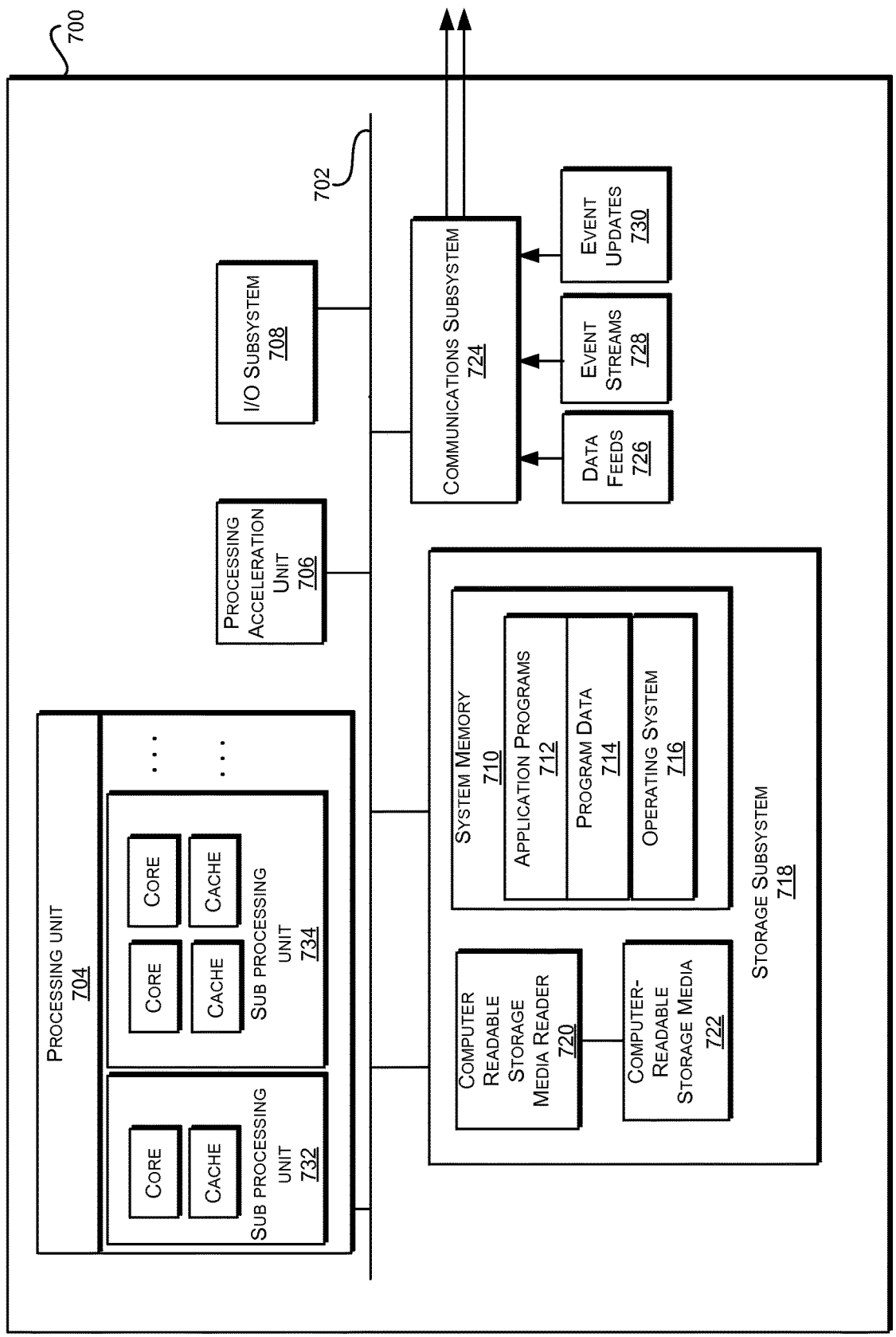
FIG. 7 illustrates an exemplary computer system that may be used to implement an embodiment of the present invention.

FIG. 7 illustrates an exemplary computer system 700 that may be used to implement an embodiment of the present invention. In some embodiments, computer system 700 may be used to implement any of the various servers and computer systems described above. As shown in FIG. 7, computer system 700 includes various subsystems including a processing subsystem 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 710 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present invention.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the account management system 112 depicted in FIG. 1 may receive user login information including input related to a training word from client devices using communication subsystem 724.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method for providing a view of tenant data as stored across data centers of a cloud storage provider, the computer- implemented method comprising:

receiving a data visualization request from a device of a tenant of a plurality of tenants of the cloud storage provider;

analyzing the data visualization request to identify one or more data centers of the cloud storage provider storing one or more data items owned by the tenant;

requesting a plurality of data item metadata files from the one or more data centers for each of a plurality of data items stored in the one or more data centers, wherein each data item metadata file comprises information about an associated data item of the plurality of data items including a name of the associated data item, a geographic location of the associated data item, a storage node of the one or more data centers on which the associated data item is stored, and an access policy for the associated data item;

applying the access policy to the data item metadata file, wherein the access policy indicates which tenants of the plurality of tenants have access to the associated data item and data item metadata file, and wherein the tenant does not own a first subset of the plurality of data items, and wherein the tenant owns a second subset of the plurality of data items;

generating a data visualization interface using the data item metadata file and the access policy for each of the plurality of data items, the data visualization interface comprising a visual representation of at least a portion of the plurality of data items, the visual representation comprising an illustration including each of the one or more data centers and within each of the one or more data centers, (1) for each data item of the second subset of the plurality of data items at the data center, a depiction and information of a storage location of the data item including a storage node of the one or more data centers on which the data item is stored, a geographic location of the storage node, and a name of the data item, and (2) for each data item of the first subset of the plurality of data items stored within a storage node shared with one of the data items of the second subset of the plurality of data items, a restricted visualization of the data item; and providing the data visualization interface to the device of the tenant.

2. The computer-implemented method of claim 1, wherein the data visualization interface further comprises:

a first visual indication of an aggregated physical storage space consumed by the tenant;

a second visual indication of an amount of free physical storage space available in at least one storage node associated with the one or more data centers; and a third visual indication of physical storage space in use by other tenants.

3. The computer-implemented method of claim 1, further comprising:

receiving, via the data visualization interface, an indication of a selection of a first data item of the second subset of the plurality of data items; and in response to receiving the indication of the selection, providing metadata from the data item metadata file associated with the first data item.

4. The computer-implemented method of claim 1, wherein the restricted visualization of each data item in the first subset of the plurality of data items comprises restricting access to the associated data item metadata file or depicting the data item as greyed-out.

5. The computer-implemented method of claim 1, wherein each data item metadata file further comprises a storage profile for the associated data item, the method further comprising:

applying each storage profile to the data visualization request.

6. The computer-implemented method of claim 5, wherein each storage profile defines storage locations where the associated data item is authorized to be stored.

7. The computer-implemented method of claim 6, wherein each storage profile is associated with all data items owned by the tenant.

8. A system for providing a view of tenant data as stored across data centers of a cloud storage system, the system comprising:
   a cloud storage system, including a plurality of data centers that provide one or more cloud-based storage services; and
   a cloud file manager comprising:
      one or more processors, and
      a memory having stored thereon instructions that, when executed by the one or more processors, cause the one or more processors to:
         receive a data visualization request from a device of a tenant of a plurality of tenants of the cloud storage system; and
         in response to receiving the data visualization request: analyze the data visualization request to identify one or more data centers of the plurality of data centers storing one or more data items owned by the tenant;
         request a plurality of data item metadata files from the one or more data centers for each of a plurality of data items stored in the one or more data centers, wherein each data item metadata file comprises information about an associated data item of the plurality of data items including a name of the associated data item, a geographic location of the associated data item, a storage node of the one or more data centers on which the associated data item is stored, and an access policy for the associated data item;
         apply the access policy to the data item metadata file, wherein the access policy indicates which tenants of the plurality of tenants have access to the associated data item and data item metadata file, and wherein the tenant does not own first subset of the plurality of data items, and wherein the tenant owns a second subset of the plurality of data items;
         generate a data visualization interface using the data item metadata file and the access policy for each of the plurality of data items, the data visualization interface comprising a visual representation of at least a portion of the plurality of data items, the visual representation comprising an illustration including each of the one or more data centers and within each of the one or more data centers, (1) for each data item of the second subset of the plurality of data items at the data center, a depiction and information of a storage location of the data item including a storage node of the one or more data centers on which the data item is stored, a geographic location of the storage node, and a name of the data item, and (2) for each data item of the first subset of the plurality of data items stored within a storage node shared with one of the data items of the second subset of the plurality of data items, a restricted visualization of the data item; and
         provide the data visualization interface to the device of the tenant.

9. The system of claim 8, wherein the data visualization interface further comprises:
   a first visual indication of an aggregated physical storage space consumed by the tenant;
   a second visual indication of an amount of free physical storage space available in at least one storage node associated with the one or more data centers; and
   a third visual indication of physical storage space in use by other tenants.

10. The system of claim 8, wherein the instructions comprise further instructions that, when executed by the one or more processors, cause the one or more processors to:
   receive, via the data visualization interface, an indication of a selection of a first data item of the second subset of the plurality of data items; and
   in response to receiving the indication of the selection, provide metadata from the data item metadata file associated with the first data item via the data visualization interface.

11. The system of claim 8, wherein the restricted visualization of each data item in the first subset of the plurality of data items comprises restricting access to the associated data item metadata file or depicting the data item as greyed-out.

12. The system of claim 8, wherein each data item metadata file further comprises a storage profile for the associated data item, and wherein the instructions comprise further instructions that, when executed by the one or more processors, cause the one or more processors to:
   apply each storage profile to the data visualization request.

13. The system of claim 12, wherein each storage profile defines storage locations where the associated data item is authorized to be stored.

14. The system of claim 13, wherein each storage profile is associated with all data items owned by the tenant.

15. A non-transitory computer-readable storage medium including instructions for providing a view of tenant data as stored across data centers of a cloud storage provider, the instructions being stored thereon which, when executed by one or more processors, cause the one or more processors to perform a method comprising:
   receiving a data visualization request from a device of a tenant of a plurality of tenants of the cloud storage provider;
   analyzing the data visualization request to identify one or more data centers of the cloud storage provider storing one or more data items owned by the tenant;
   requesting a plurality of data item metadata files from the one or more data centers for each of a plurality of data items stored in the one or more data centers, wherein each data item metadata file comprises information about an associated data item of the plurality of data items including a name of the associated data item, a geographic location of the associated data item, a storage node of the one or more data centers on which the associated data item is stored, and an access policy for the associated data item;
   applying the access policy to the data item metadata file, wherein the access policy indicates which tenants of the plurality of tenants have access to the associated data item and data item metadata file, and wherein the tenant does not own a first subset of the plurality of data items, and wherein the tenant owns a second subset of the plurality of data items;
   generating a data visualization interface using the data item metadata file and the access policy for each of the plurality of data items, the data visualization interface comprising a visual representation of at least a portion of the plurality of data items, the visual representation comprising an illustration including each of the one or more data centers and within each of the one or more data centers, (1) for each data item of the second subset of the plurality of data items at the data center, a depiction and information of a storage location of the data item including a storage node of the one or more data centers on which the data item is stored, a geographic location of the storage node, and a name of the data item, and (2) for each data item of the first subset of the plurality of data items stored within a storage node shared with one of the data items of the second subset of the plurality of data items, a restricted visualization of the data item; and providing the data visualization interface to the device of the tenant.

16. The non-transitory computer-readable storage medium of claim 15, wherein the data visualization interface further comprises:
a first visual indication of an aggregated physical storage space consumed by the tenant;
a second visual indication of an amount of free physical storage space available in at least one storage node associated with the one or more data centers; and
a third visual indication of physical storage space in use by other tenants.

17. The non-transitory computer-readable storage medium of claim 15, including further instructions stored thereon which, when executed by the one or more processors, cause the one or more processors to:
receive, via the data visualization interface, an indication of a selection of a first data item of the second subset of the plurality of data items; and
in response to receiving the indication of the selection, provide metadata from the data item metadata file associated with the first data item.

18. The non-transitory computer-readable storage medium of claim 15, wherein the restricted visualization of each data item in the first subset of the plurality of data items comprises restricting access to the associated data item metadata file or depicting the data item as greyed-out.

19. The non-transitory computer-readable storage medium of claim 15, wherein each data item metadata file further comprises a storage profile for the associated data item, each storage profile defines storage locations where the associated data item is authorized to be stored, wherein the instructions including further instructions stored thereon which, when executed by the one or more processors, cause the one or more processors to:
apply each storage profile to the data visualization request.

20. The non-transitory computer-readable storage medium of claim 19, wherein each storage profile is associated with all data items owned by the tenant.

* * * * *